United States Patent [19]

Kaiya et al.

[11] 4,176,109

[45] Nov. 27, 1979

[54] WATER-SOLUBLE COATING COMPOSITION

[75] Inventors: Atsushi Kaiya, Kawasaki; Yutaka Otsuki; Hideo Horii, both of Yokohama, all of Japan

[73] Assignee: Nippon Oil Co., Ltd., Tokyo, Japan

[21] Appl. No.: 844,543

[22] Filed: Oct. 25, 1977

Related U.S. Application Data

[60] Division of Ser. No. 518,824, Oct. 29, 1974, abandoned, which is a continuation of Ser. No. 851,905, Nov. 16, 1977, Pat. No. 4,145,501.

[30] Foreign Application Priority Data

Nov. 1, 1973 [JP] Japan .............................. 48/123042

[51] Int. Cl.$^2$ .............................................. C08K 5/09
[52] U.S. Cl. ....................... 260/31.2 MR; 106/14.05; 106/252; 260/18 R; 260/29.2 UA; 260/31.8 DR; 260/32.6 A; 260/32.8 A; 260/33.2 R; 260/33.4 R; 260/42.21; 260/42.53; 260/45.8 R; 260/346.74; 562/590

[58] Field of Search ................ 526/272; 260/879, 887, 260/880, 45.8 W, 33.4 R, 33.2 R, 31.2 MR, 31.8 DR, 32.8 R, 32.6 A, 32.6 N, 42.21, 42.53, 346.74; 106/14, 252; 562/590, 18 R, 29 UA, 42.21, 42.53

[56] References Cited

U.S. PATENT DOCUMENTS

| 3,681,276 | 8/1972 | Nagahism et al. | 260/33.4 R |
|---|---|---|---|
| 3,689,446 | 9/1972 | Furuya et al. | 260/23.7 R |
| 3,705,866 | 12/1972 | Shibata et al. | 260/23.7 R |
| 3,789,046 | 1/1974 | Heidel | 260/23.7 R |
| 3,814,709 | 6/1974 | Meissner et al. | 260/23.7 R |

Primary Examiner—J. Ziegler
Attorney, Agent, or Firm—Frank J. Jordan

[57] ABSTRACT

There is disclosed a water-soluble coating composition having excellent properties including corrosion resistance, adhesion, impact resistance and so on. The coating composition comprises an adduct of a butadiene lower polymer or copolymer and $\alpha,\beta$-ethylenically unsaturated dicarboxylic acid compound resulting from the special addition reaction, a hydrophilic solvent and a neutralizer.

12 Claims, No Drawings

WATER-SOLUBLE COATING COMPOSITION

This is a division of application Ser. No. 518,824, filed Oct. 29, 1974, now abandoned; replaced by continuation application, Ser. No. 851,905, filed Nov. 16, 1977, now allowed, U.S. Pat. No. 4,145,501.

BACKGROUND OF THE INVENTION

This invention relates to a water-soluble coating composition having excellent physical properties including corrosion resistance, adhesion, impact resistance and so on.

Heretofore, as raw materials for a water-soluble coating composition there have been used natural oils. However, recently, use of natural oils for the above purposes has been regarded to be disadvantageous because their supply is precarious and they cause pollution in respect of smell and smoke. Therefore, instead of natural oils a butadiene low polymer has been given much consideration as a film forming material for a water-soluble coating composition since the coating film formed from a butadiene low polymer or copolymer has very excellent film properties in respect of chemical resistance, solvent resistance, water resistance, corrosion resistance, levelling property and so forth as compared with those prepared from the conventional film forming materials such as natural oils.

In order to prepare a film forming material for a water-soluble coating composition, it is necessary to introduce hydrophilic groups such as carboxyl, hydroxyl, ether, amino and sulfonic acid groups into the molecular structure of the material.

With regard to the introduction of the carboxyl group in to the butadiene lower polymer or copolymer, it is well known that an adduct can be prepared by heating it with $\alpha, \beta$-ethylenically unsaturated dicarboxylic acid compound. The addition reaction between butadiene lower polymer or copolymer and $\alpha, \beta$-ethylenically unsaturated dicarboxylic acid is carried out through a radical or thermal reaction. Both reactions are accompanied by cross linking reactions among molecules of starting polymer so that gelation of the adduct occurs, which is disadvantageous.

In order to eliminate the above noted difficulties there are known many methods for preparing such an adduct by the addition of certain compounds such as hydroquinone, 2, 6-di-tert-butyl-4-methyl phenol, urethane compounds or metallic salts to the thermal reaction system. According to these methods the amount of addition of $\alpha, \beta$-ethylenically unsaturated dicarboxylic acid compounds is very small, the adduct is greatly colored, the viscosity of the adduct is too high to be treated and the molecular weight of the usable starting polymer is limited to a very low range so that the adduct produced by the above conventional methods has insufficient properties as a film forming material for a water-soluble coating composition.

With these difficulties in view, the present inventors made extensive studies on methods for preventing various undesirable side reactions such as the above noted gelation from the addition reaction between a butadiene lower polymer or copolymer and $\alpha, \beta$-ethylenically unsaturated carboxylic acid and as the result found that some compounds have excellent effects for the above noted purposes. Japanese patent applications for the above inventions were filed (Japanese patent application Nos. 47-126461 and 48-57676). According to these inventions accomplished by the present inventors the undesirable side reaction including the gelation of the addition reaction can be completely prevented without causing any ill effects to the reaction and further an adduct with a large amount of addition can be obtained from starting polymer having a high molecular weight.

It is an object of the present invention to provide a water-soluble coating composition which will eliminate or alleviate the foregoing disadvantages encountered with the prior-art coating compositions.

It is a further object of this invention to provide a water-soluble coating composition having excellent properties in respect of corrosion resistance, adhesion, impact resistance and so on.

These objects and other features of this invention will be apparent from the following description taken in connection with certain embodiments of the invention.

BRIEF SUMMARY OF THE INVENTION

As a result of extensive research of the application of the above noted adducts to a water-soluble coating composition, it has found that the above-mentioned objects of the invention may be achieved by the use of these adducts.

Briefly stated, the inventive concept of this invention resides in a water-soluble coating composition comprising an adduct (1) of a butadiene lower polymer or lower copolymer (A) and $\alpha, \beta$-ethylenically unsaturated dicarboxylic acid compound (B) prepared by the reaction between said (A) and (B) in the presence of one or more compounds (C) selected from p-phenylenediamine derivatives, catechol derivatives, pyrogallol derivatives, nitrosamines, quinoline derivatives and naphtol derivatives; a hydrophilic solvent (2); and a neutralizer (3).

DETAILED DESCRIPTION OF THE INVENTION

The butadiene lower polymers used in the present invention are butadiene polymers containing a large proportion of 1,2-double bonds or a large proportion of 1,4-double bonds or large proportions of both 1,2- and 1,4-double bonds. The butadiene polymers which are prepared by polymerizing butadiene alone or with other monomers in the presence of alkali metal or organic alkali metal as a catalyst, are typical ones used in the present invention. In order to regulate the molecular weight, to reduce the gel content and to form a light-colored polymer, the polymerization is typically a living polymerization which is carried out in a tetrahydrofuran medium or a chain transfer polymerization in which ethers such as dioxane and alcohols such as isopropyl alcohol are added and aromatic hydrocarbons such as toluene and xylene are used as the chain transfer agent or the solvent. A lower polymer in which most of the double bonds the in butadiene units are 1,2-double bonds can be prepared by the above methods, and this lower polymer can be used in the present invention. A butadiene lower polymer in which most of the double bonds in the butadiene units are 1,4-double bonds and which can be used in the present invention can be prepared by polymerizing butadiene alone or with other monomers in the presence of a catalyst comprising a compound of a metal of group VIII of the periodic table and in alkyl aluminum.

A lower copolymer as referred to in the present invention means copolymers of butadiene with conjugated diolefins other than butadiene such as isoprene, 2,3-dimethyl butadiene and piperylene or with vinylsubstituted aromatic compounds such as α-methyl styrene, vinyltoluene and divinylbenzene as the co-monomers. Butadiene lower copolymers containing less than 50 percent by weight of said co-monomers may be preferably used.

Further, in the present invention, modified products of the butadiene lower polymer or copolymer which are prepared by heating and partially oxidizing the butadiene lower polymer or copolymer with blowing off air in the presence of carboxylic acid metallic salts such as cobalt naphthenate or manganese octenoate, or prepared by thermal treatment of the butadiene lower polymer or copolymer in the presence of an organic peroxide, may also be used.

The butadiene lower polymer or copolymer in the present invention is liquid or semi-solid at room temperature, and the number average molecular weight thereof is in the range of 200 to 10,000.

Said α, β-ethylenically unsaturated dicarboxylic acid compounds in the present invention may be represented by the following general formula:

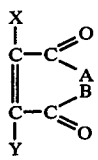

in which X and Y are hydrogen atoms or alkyl groups, and may be the same or different; and A and B are hydroxyl groups, alkoxyl groups or an —O— bond formed by linking A and B together. Said α, β-ethylenically unsaturated dicarboxylic acid compounds include anhydrides of maleic acid such as maleic anhydride, citraconic anhydride and 1,2-diethylmaleic anhydride, and esters of maleic acid such as monomethylmaleic acid, dimethylmaleic acid and diethylmaleic acid, and those having 12 or less carbon atoms in each molecule may be advantageously used.

The amount of α, β-ethylenically unsaturated dicarboxylic acid compound as used in the present invention is not especially restricted; however, when the adduct is to be used as a water-soluble or water-dispersible film forming material, the rate of addition calculated from the acid value and saponification value may not be more than 50 percent by weight, and 3 to 50 percent by weight is preferable. In general, the higher the rate of addition is, the larger the viscosity becomes. In addition to that, the water-solubility of the adduct increases and, as a result, the water resistance of the water-soluble coating film decreases. On the contrary, when the rate of addition is too low, the hydrophilic property of the adduct decreases, and the water-solubility or water-dispersibility of the adduct is also lowered.

In case an acid anhydride such as maleic anhydride is used as the α, β-ethylenically unsaturated dicarboxylic acid compound of the invention, the acid anhydride rings are opened after the addition reaction by solvolysis using preferably water or alcohol.

In the addition reaction of a butadiene lower polymer or copolymer, and α, β-ethylenically unsaturated dicarboxylic acid compound of the present invention, one or more compounds selected from (1) p-phenylenediamine derivatives, (2) catechol derivatives, (3) pyrogallol derivatives, (4) quinoline derivatives, (5) N-nitrosamines and (6) naphthol derivatives are used.

The above-mentioned p-phenylenediamine derivatives are represented by the following general formula:

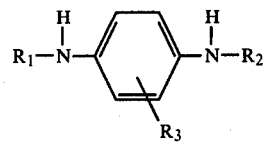

in which $R_1$ and $R_2$ are the same or different saturated hydrocarbon groups each having 1 to 20 carbon atoms, or monocyclic and polycyclic aromatic hydrocarbon groups, and $R_3$ is a hydrogen atom or a saturated hydrocarbon group having 1 to 20 carbon atoms.

More particularly, the p-phenylenediamine derivatives included in the above general formula are alkyl-p-phenylene-diamines such as N,N'-dimethyl-p-phenylenediamine, N,N'-diethyl-p-phenylenediamine, N,N'-dipropyl-p-phenylenediamine, N,N'-diisopropyl-p-phenylenediamine, N,N'-di-n-butyl-p-phenylenediamine, N,N'-di-sec-butyl-p-phenylenediamine and N,N'-di-tert-butyl-p-phenylenediamine; and aromatic group-substituted p-phenylenediamines such as N,N'-diphenyl-p-phenylenediamine, N-phenyl-N'-isopropyl-p-phenylenediamine and N,N'-di-β-naphthyl-p-phenylenediamine.

Further, the catechol derivatives in the present invention are represented by the following general formula:

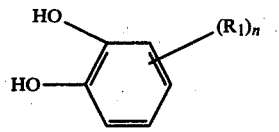

in which $R_1$ is a saturated hydrocarbon group or aromatic hydrocarbon group having 1 to 10 carbon atoms, and n is an integer which is 0, 1, 2, 3 or 4. As said catechol derivatives, there are, for example, alkyl catechols such as catechol itself, p-methylcatechol, p-ethylcatechol, p-propylcatechol, p-isopropylcatechol, p-n-butylcatechol, p-sec-butylcatechol, p-tert-amylcatechol and 1,2-dihydroxy-3-tert-butyl-5-methylbenzene; and aromatic group-substituted catechols such as p-phenylcatechol and p-(p-methylphenyl) catechol.

Furthermore, the pyrogallol derivatives in the present invention are represented by the following general formula:

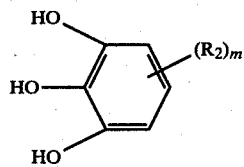

in which $R_2$ is a saturated hydrocarbon group or aromatic hydrocarbon group having 1 to 10 carbon atoms, and m is an integer which is 0, 1, 2 or 3. As said pyrogallol derivatives, there are, for example, pyrogallol and 1,2,3-trihydroxyl-5-methylbenzene.

Furthermore, the N-nitrosamines in the present invention are represented by the following general formula:

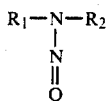

in which $R_1$ and $R_2$ are the same or different alkyl, cycloalkyl, aryl or naphthyl groups, each having 1 to 20 carbon atoms and each having or not having amino and alkoxy groups as substituent groups. As said N-nitrosamines, there are, for example, N-nitroso-dialkylamines such as N-nitroso-dimethylamine, N-nitroso-diethylamine, N-nitroso-di-n-propylamine, N-nitroso-di-n-butylamine, N-nitroso-di-n-pentylamine and N-nitroso-di-n-hexylamine; N-nitroso-cycloalkylamine such as N-nitroso-dicyclohexylamine; and other N-nitrosamines such as N-nitroso-diphenylamine, N-nitroso-dicumenylamine, N-nitroso-ditolylamine, N-nitroso-dixylylamine, N-nitroso-methylphenylamine, N-nitroso-ethylphenylamine and N-nitroso-dinaphthylamine.

Still further, the quinoline derivatives in the present invention are represented by the following general formula:

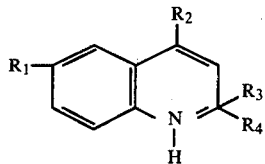

in which $R_1$ is a hydrogen atom or an alkoxy group having 1 to 5 carbon atoms, and $R_2$, $R_3$ and $R_4$ are the same or different alkyl groups each having 1 to 5 carbon atoms. As said quinoline derivatives, there are, for example, 1,2-dihydro-2,2,4-trimethylquinoline, 1,2-dihydro-2,2,4-triethylquinoline, 1,2-dihydro-2,2,4-tri-n-propylquinoline, 1,2-dihydro-2,2,4-tri-n-butylquinoline, 1,2-dihydro-2,2-dimethyl-4-ethylquinoline, 1,2-dihydro-2,2,4-trimethyl-6-methoxyquinoline, 1,2-dihydro-2,2,4-trimethyl-6-propoxyquinoline and 1,2-dihydro-2,2,4-trimethyl-6-n-butoxyquinoline.

Still further, the naphthol derivatives in the present invention are represented by the following general formula:

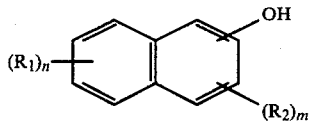

in which $R_1$ and $R_2$ are hydrogen atoms, alkyl groups each having 1 to 20 carbon atoms, nitro groups, hydroxyl groups or amino groups; n is an integer which is 1, 2 or 3; m is an integer which is 1, 2, 3 or 4; and one of $(R_1)n$ and $(R_2)m$ is one or more of nitro, hydroxyl or amino groups. As the above naphthol derivatives, there are, for example, dihydroxynaphthalenes such as 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxy-naphthalene, 1,8-dihydroxynaphthalene, 2,3-dihydroxynaphthalene, 2,6-dihydroxynaphthalene and 2,7-dihydroxynaphthalene; amino-naphthols such as 1-amino-2-naphthol, 2-amino-1-naphthol, 4-amino-1-naphthol, 5-amino-1-naphthol, 6-amino-1-naphthol, 7-amino-1-naphthol, 7-amino-2-naphthol, 8-amino-1-naphthol and 8-amino-1-naphthol and 8-amino-2-naphthol; and nitro-naphthols such as 1-nitro-2-naphthol.

As disclosed in the above, one or more compounds selected from the above-mentioned p-phenylenediamine derivatives, catechol derivatives, pyrogallol derivatives, N-nitrosamines, quinoline derivatives and naphthol derivatives are used as the additive in the preparation of the adduct of $\alpha,\beta$-ethylenically unsaturated dicarboxylic acid compound and a butadiene lower polymer or copolymer, in which the amount of said additive is in the range of 0.005 to 5 percent by weight, preferably 0.1 to 2.0 percent by weight to said butadiene lower polymer or copolymer. When the amount of said additive for inhibiting gelation is too small, the viscosity of the adduct obtained is very much increased, and sometimes, the adduct becomes a gel, or the water-solubilizing of the adduct becomes difficult. On the contrary, it is economically disadvantageous to add excess amount of said additive, and such excess addition sometimes have an adverse effect on the addition reaction. The effect of said additive is not decreased even in the presence of other additives such as hydroquinone and 2,6-di-tert-butyl-4-methylphenol which have little gelation inhibiting effect.

The addition reaction of the present invention between $\alpha,\beta$-ethylenically unsaturated dicarboxylic acid compound and a butadiene lower polymer or copolymer in the presence of said additive, may be carried out at a temperature of 120° to 250° C., preferably 150° to 220° C. If the reaction temperature is lower, the reaction period becomes long, and if the reaction temperature is too high, there is the risk of gelation even though the reaction period may be shortened.

In the present invention, the following oil compound can be added to the reaction system of said butadiene lower polymer or copolymer and $\alpha,\beta$-ethylenically unsaturated dicarboxylic acid compound.

Examples of said oil component are (1) animal and vegetable oils having iodine value of 100 or more such as linseed oil, tung oil, soybean oil, dehydrated castor oil, safflower oil, sardine oil, herring oil and saury oil; (2) unsaturated fatty acids such as linoleic acid, linolenic acid, oleic acid and $\alpha$-eleostearic acid; (3) modified oils such as boiled oil and stand oil which are prepared by heat treatment of said animal and vegetable oils listed in the above (1); (4) dimeric acids of the fatty acids as defined in the above (2); and (5) styrenated oil which is prepared by copolymerizing animal or vegetable oil and styrene. These oil components may be used with the butadiene lower polymer or copolymer by mixing together in any ratios, and the above mixture can be partially oxidized by heating at 60° to 200° C. with blowing off air in the presence of a conventional drier, namely, a carboxylic acid metal salt such as copper naphthenate or manganese octenoate, or said mixture can be polymerized by heating at a temperature of 50° to 280° C. in the presence or absence of an organic peroxide such as dicumyl peroxide or benzoyl peroxide. The thus prepared partially oxidized products and polymerized products may also be used in the present invention.

In the present invention, when the viscosity of a butadiene lower polymer or copolymer is high, a diluent may be used so as to reduce the viscosity and to smooth the addition reaction. Such diluent should have a boiling point which is the same as or lower than the addition reaction temperature, and be inert to the butadiene lower polymer or copolymer, α,β-ethylenically unsaturated dicarboxylic acid compound, p-phenylenediamine derivatives, catechol derivatives, pyrogallol derivatives, N-nitrosamines, quinoline derivatives and naphthol derivatives. For example, petroleum fractions such as toluene, xylene and kerosene may be preferably used as the above-mentioned diluents.

The inert gas for the displacement of the reaction system may be selected from among those which are inert to the butadiene lower polymer, α,β-ethylenically unsaturated dicarboxylic acid compound and said additives; for example, argon, nitrogen and carbon dioxide may be preferably used.

The adducts of the present invention which are prepared from α,β-ethylenically unsaturated dicarboxylic acid compound and a butadiene lower polymer or copolymer in the presence of p-phenylenediamine derivatives, catechol derivatives, pyrogallol derivatives, N-nitrosamines, quinoline derivatives or naphthol derivatives, are almost colorless or light brown liquids or semisolids at room temperature, and each has a number average molecular weight of 200 to 10,000. Through the process of the present invention, the molecular weight of the butadiene lower polymer or copolymer is increased by the addition of the α,β-ethylenically unsaturated dicarboxylic acid compound, and the viscosity thereof is somewhat increased, while the iodine value is decreased to some extent.

The adduct of the present invention may be used as a water-soluble coating composition by the addition of a neutralizer in the presence of a hydrophilic agent or by the addition of the latter after the addition of the former. The coating composition according to the present invention, if necessary, may be dissolved or dispersed uniformly by the addition of a siccative, a pigment and other agents and after that may be diluted with water according to its purpose. The term "a water-soluble coating composition" used herein means a coating composition which is perfectly dissolved in water or a hydrophilic solvent, or particles of which are dispersed therein.

A water-soluble coating composition according to this invention typically includes so called water paints, electro deposition paint or the like which are diluted with water when coating.

Hydrophilic agents used herein are hydrogen containing compounds having substantial affinity with water and include alcohols such as methanol, ethanol, butanol and the like; cellosolves such as ethylene glycol monomethyl ether, ethylene glycol monoethyl ether, ethylene glycol monobutyl ether and the like; cyclic ethers such as tetra-hydrofuran, dioxane and the like; ketoalcohols such as diacetone alcohol and the like; ketones such as acetone, methyl ethyl ketone and the like; esters such as methyl acetate and the like. The hydrophilic agent may be added in an amount of less than 100 parts by weight, preferably 5–50 parts by weight, to 100 parts by weight of the butadiene lower polymer or copolymer. Amounts exceeding 100 parts by weight of this agent are expensive and impair the quality of the composition as a water soluble coating composition.

Neutralizers used herein are basic compounds and include alkalimetal hydroxides such as sodium hydroxide, potassium hydroxide and the like; aqueous ammonia; organic amines such as alkylamines, including diethylamine, triethylamine, N-morpholine, polyamines, including ethylenediamine, diethylenetriamine and the like, alkanolamines such as monoethanolamine, diethanolamine, triethanolamine and the like, alicyclicamines such as cyclohexylamine and the like. These neutralizers may be used alone or in combinations thereof and in a range of 0.2 to 2.0 equivalents to the amount of α,β-ethylenically unsaturated dicarboxylic acid. Usually these may be used at a pH of 6.0 to 9.0. More than 2.0 equivalents of these neutralizers would be expensive and fail to leave the coatings with sufficient water resistance.

The siccatives employable in the present invention are widely used to accelerate the drying and hardening of an adduct of a butadiene polymer or copolymer and an oil component and α,β-ethylenically unsaturated dicarboxylic acid. As the above siccatives, there are metallic salts of carboxylic acids such as cobalt, manganese, lead, iron, zinc, zirconium and calcium salts of octenic acid, naphtenic acid, rosilic acid and fatty acids of toll oil. The siccatives may be used in an amount of less than 1.0 percent by weight equivalent to metallic part thereof to the adduct. These siccatives are preferably highly water dispersible and hydrophilic and are stable in aqueous phase.

The pigments employable in the present invention include inorganic pigments such as titan white, zinc white, lead white, chromium oxide, ultramarine, rouge, carbon black and the like; organic pigments such as nitroso-, nitro-, azo-, lake- and phthalocyanine-type pigments and the like. These pigments are preferably highly water dispersible and hydrophilic and are stable in aqueous phase.

The water-soluble coating composition according to the present invention serves as an electrodeposition paint or an immersion deposition paint and forms a tough film by being heated at 100° C. to 250° C. for 2 to 90 minutes.

The water-soluble coating composition according to the present invention is excellent in stability in water and the film of said coating composition coated on both a non-treated steel plate and a chemically treated steel plate is excellent with respect to corrosion resistance, throwing power, impact resistance, adhesion, leveling property and hardness.

The following examples are provided to further illustrate the present invention, but these are not to be regarded as limiting.

INVENTIVE EXAMPLE I 1,000 parts by weight of a butadiene lower polymer or copolymer having a number average molecular weight of 1,000 and a viscosity of 42 poise (25° C.), 333 parts by weight of xylene, 163 parts by weight of maleic anhydride and 2 parts by weight of N-phenyl-N'-isopropyl-p-phenylenediamine were fed into a 2 liter stainless steel autoclave provided with a magnetic stirrer. The air in the reaction system was sufficiently displaced by dried nitrogen gas. The reaction mixture was stirred at 190° C. for 8 hours to cause the addition reaction between said polybutadiene and maleic anhydride. After the reaction, the autoclave was cooled to room temperature. Then it was treated in a reduced pressure of 1 mmHg at 150° C. to distill off the solvent, namely, xylene and a small amount of remaining maleic anhydride, whereby an adduct of maleic anhydride having an acid value of 80.0 and a viscosity of 9,500 poise (25° C.) was obtained. 500 parts by weight of the adduct thus obtained were fed to a 1 liter separable flask having a reflux condenser. After the adduct was heated to 70° C., 40 parts by weight of water and 10 parts by weight of triethylamine were added thereto. The mixture was heated at 80° C. for 2 hours to open the rings of the anhydride groups. After 80 parts by weight of ethylene glycol monoethyl ether was fed to the separable flask, it was cooled to room temperature. Then the reaction mixture was neutralized with a deionized water solution of triethylamine in such a manner that the pH of the obtained solution will be 8.2 when it contains 10 parts by weight of solids. After that, the solution was diluted with deionized water so as to contain 10 parts by weight of solids. Thus a clear electrodeposition solution was prepared.

Steel test pieces (0.8 mm×70 mm×150 mm) treated with zinc phosphate were immersed in the thus prepared clear electrodeposition solution at 25° C. and electric voltages of 80, 100, 120, 150, 200, 250 and 300 volts, respectively, were applied for 3 minutes under stirring and with 10 cm of a distance between electrodes. The test pieces were thus electrodeposition coated and taken out from the solution. Then the test pieces were washed with water to remove the superfluous electrodeposition solution thereon and were air-dried in a room having a temperature of 25° C. and a relative humidity of 75 percent. After air-drying, these were put in an oven circulating hot air of 160° C. for 30 minutes to harden the films coated thereon. Measurements of the thicknesses of the obtained film showed the following results: (voltage/film thickness) 80 V/10μ, 100 V/12μ, 120 V/13μ, 150 V/15μ, 200 V/20μ, 250 V/23μ, 300 V/25μ. All of the films showed excellent film surfaces and there were not craters or other defects thereon.

The coated film of 20μ thickness was subjected to various performance tests and exhibited a 4 H pencil hardness, more than 240 hours of corrosion resistance, an Erichsen test value of 65, a DuPont impact test value of 40 cm and a cross cut test value of 100/100.

COMPARATIVE EXAMPLE I

The procedure described in Inventive Example I was repeated except that 3 parts by weight of 2,6-di-tert-butyl-4-methyl-phenol were used as a gelation inhibitor in place of 2 parts by weight of N-phenyl-N'-isopropyl-p-phenylenediamine whereby an adduct of maleic anhydride having an acid value of 76 and a viscosity of 45,000 poise (25° C.) was obtained and then an electrodeposition solution was prepared in the same manner as in Inventive Example I. Test pieces were electrodeposition coated and heated to form film thereon in the same manner as in Inventive Example I.

The thicknesses of the films varied according to the used voltage as follows: 80 V/8μ, 100 V/10μ, 120 V/12μ, 150 V/15μ, 200 V/18μ, 250 V/20μ, 300 V/21μ.

The whole film surface was not good in gross and leveling property and craters appeared thereon. The film having a thickness of 20μ was subjected to various performance tests and showed a pencil hardness of 2 B , 50 hours of corrosion resistance, an Erichsen test value of 2.0, DuPont impact test value of 30 cm. and a cross cut test value of 65/100.

It is understood from the comparison of Inventive Example I and Comparative Example I that various properties of the film produced by using an adduct of a butadiene lower polymer or copolymer and α,β-ethylenically unsaturated dicarboxylic acid compound as a water soluble coating composition depend upon the addition of an effective gelation inhibitor.

Therefore, it is apparent that the adduct according to the present invention can be advantageously used as a water-soluble coating composition.

INVENTIVE EXAMPLES II-XII AND COMPARATIVE EXAMPLES II-VII 1000 parts by weight of a butadiene lower polymer or copolymer having a number average molecular weight of 2,000 and a viscosity of 150 poise (250° C.), 333 parts by weight of xylene, 163 parts by weight of maleic anhydride, 2.0 parts by weight of the gelation inhibitors in Inventive Examples II-XII, 4.0 parts by weight of the gelation inhibitors in comparative Examples II-VI and 10 parts by weight of copper naphthenate in Comparative Example VII were fed into a 2 liter stainless steel autoclave having a magnetic stirrer, respectively. The air in the reaction system was sufficiently displaced by dried nitrogen gas. The reaction mixture was sufficiently stirred, and heating was continued for 8 hours at 190° C. to cause the addition reaction between said butadiene lower polymer or copolymer and maleic anhydride. The adduct was prepared in the same manner as in Inventive Example I. To 500 parts by weight of the adduct were added 150 parts by weight of water and 20 parts by weight of triethylamine and these were admixed for 30 minutes at 30° C. This admixture was dissolved in 100 parts by weight of ethylene glycol monobutyl ether. The pH of the adduct solution was adjusted with triethylamine to 8.3. Thus a water dispersed varnish containing 60 percent by weight of a resinous content was obtained. This varnish was combined with the other additives according to the recipe shown in Table I and dispersed in a ballmill. The resultant sample was diluted with deionized water to make an electrodeposition solution containing 10 percent solids. Steel test pieces were electrodeposition coated with said solution in the same manner as described in Inventive Example I. The film coated on the test piece was hardened in a hot air circulation type oven for 30 minutes at 170° C. The finished test pieces were subjected to various performance tests, with the results shown in Table II.

TABLE I

| | |
|---|---|
| about 60 percent varnish | 100 parts by weight (solid content) |
| rutile type titan white | 30 parts by weight |
| carbon black | 0.5 parts by weight |
| strontium chromate | 1.0 parts by weight |

INVENTIVE EXAMPLE XIII AND COMPARATIVE EXAMPLE VII 500 parts by weight of a butadiene lower polymer or copolymer having a number average molecular weight of 3,500 and a viscosity of 1100 poise (25° C.), 500 parts by weight of linseed oil and 333 parts by weight of xylene were fed into a 2 liter stainless steel autoclave having a magnetic stirrer. The air in the reaction system was sufficiently displaced by dried nitrogen gas. The reaction mixture was stirred and heated at 260° C. for 3 hours and thereafter was cooled to room temperature. Then 192 parts by weight of maleic anhydride and 2 parts by weight of N-phenyl-N'-isopropyl-p-phenylenediamine were fed to the autoclave and the air in the reaction system was again displaced by dried nitrogen gas. The reaction mixture was stirred and heated at 190° C. for 10 hours to cause the addition reaction. The adduct was recovered in the same manner as described in Inventive Example I. The adduct showed an acid value of 90 and a viscosity of 6000 poise (25° C.).

An electrodeposition coating solution containing the above adduct was prepared in the manner described in Inventive Example II. A test piece was coated with the coating solution and heated to harden the coated film. The finished test piece was subjected to various performance tests, with the results shown in Table II.

For comparison, the procedure described above was repeated except that 3 parts by weight of p-tert-butyl-hydroquinone were used in place of 2 parts by weight of N-phenyl-N'-isopropyl-p-phenylenediamine, whereby an adduct having an acid value of 89 and a viscosity of 35,000 poise (25° C.) was obtained and then an electrodeposition solution was prepared in the same manner as above. A test piece was coated with the coating solution and heated to harden the coated film. The finished tests piece was subjected to various performance test, with the results shown in Table II.

TABLE II

| | Gelation inhibitor | | Adduct | | Characteristics of Electrodeposition Film | | |
|---|---|---|---|---|---|---|---|
| | Structural formula | Amount * | Acid value | Viscosity (poise 25° C.) | Voltage (V) | Film thickness (μ) | Throwing power (cm)** |
| Inventive Example II | [structure: Ph-NH-C6H4-NH-CH(CH3)2] | 0.2 | 80.0 | 25,000 | 180$^V$-24$^μ$ | | 20.3 |
| Inventive Example III | [structure: Ph-NH-C6H3(NH)-NH-Ph] | " | 79.5 | 24,000 | 180-23 | | 18.4 |
| Inventive Example IV | [structure: (sec-Bu)-NH-C6H4-NH-(sec-Bu)] | " | 30.0 | 23,000 | 180-23 | | 19.2 |
| Inventive Example V | [structure: (CH3)3C-C6H3(OH)-OH] | " | 80.5 | 35,000 | 180-24 | | 21.1 |
| Inventive Example VI | [structure: C6H3(OH)3 pyrogallol] | " | 78.5 | 30,000 | 180-21 | | 19.0 |

TABLE II-2

| | Gelation inhibitor | | Adduct | | Characteristics of Electrodeposition Film | | |
|---|---|---|---|---|---|---|---|
| | Structural formula | Amount * | Acid value | Viscosity (poise 25° C.) | Voltage (V) | Film thickness (μ) | Throwing power (cm)** |
| Inventive Example VII | [structure: Ph-N(Ph)-N=O] | 0.2 | 79.0 | 27,000 | 180$^V$-23$^μ$ | | 17.5 |
| Inventive Example VIII | $H_5C_2$—N—$C_2H_5$ with N=O | 0.2 | 79.0 | 29,000 | 180-19 | | 18.6 |
| Inventive Example IX | [structure: ethoxy-dimethyl-quinoline, H5C2O- substituted, CH3 groups] | " | 79.5 | 34,000 | 180-23 | | 17.4 |

TABLE II-2-continued

| | Gelation inhibitor | | Adduct | | Characteristics of Electrodeposition | | |
|---|---|---|---|---|---|---|---|
| | | | | | | Film | |
| | Structural formula | Amount * | Acid value | Viscosity (poise 25° C.) | Voltage (V) | thickness (μ) | Throwing power (cm)** |
| Inventive Example X | 1,5-dihydroxynaphthalene | " | 80.0 | 33,000 | 180–24 | | 17.7 |

TABLE II-3

| | Gelation inhibitor | | Adduct | | Characteristics of Electrodeposition | | |
|---|---|---|---|---|---|---|---|
| | | | | | | Film | |
| | Structural formula | Amount * | Acid value | Viscosity (poise 25° C.) | Voltage (V) | thickness (μ) | Throwing power (cm)** |
| Inventive Example XI | 1-hydroxy-3-nitronaphthalene | 0.2 | 80.5 | 29,000 | $180^V$-$19^\mu$ | | 17.2 |
| Inventive Example XII | 1-hydroxy-4-aminonaphthalene | " | 79 | 31,000 | 180–20 | | 16.5 |
| Inventive Example XIII | N-phenyl-N'-isopropyl-p-phenylenediamine | 0.4 | 90 | 6,000 | 150–23 | | 19.6 |
| Comparative Example II | hydroquinone | 0.2 | gelled during the addition reaction | | — | | — |
| Comparative Example III | hydroquinone | 0.4 | 77 | 45,000 | 170–19 | | 11.2 |
| Comparative Example IV | tert-Bu-hydroquinone | " | 76 | 44,000 | 170–21 | | 10.5 |

TABLE II-4

| | Gelation inhibitor | | Adduct | | Characteristics of Electrodeposition | | |
|---|---|---|---|---|---|---|---|
| | | | | | | Film | |
| | Structural formula | Amount * | Acid value | Viscosity (poise 25° C.) | Voltage (V) | thickness (μ) | Throwing power (cm)** |
| Comparative Example V | 2,6-di-tert-butyl-4-methylphenol | 0.4 | 75 | 50,000 | $160^V$-$22^\mu$ | | 10.2 |
| Comparative Example VI | thiobisphenol derivative | " | 77 | 34,000 | 180–20 | | 10.0 |
| Comparative Example VII | Copper naphtenate | 1.0 | 76 | 31,000 | 180–21 | | 9.0 |

TABLE II-4-continued

| | Gelation inhibitor | | Adduct | | Characteristics of Electrodeposition | | |
|---|---|---|---|---|---|---|---|
| | | | | | | Film | |
| | Structural formula | Amount * | Acid value | Viscosity (poise 25° C.) | Voltage (V) | thickness (μ) | Throwing power (cm)** |
| Comparative Example VIII | 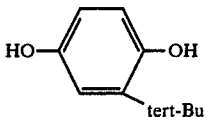 | 0.6 | 89 | 35,000 | 150-21 | | 12.1 |

TABLE II-5

| | | | | | Properties of coated film*** | | | |
|---|---|---|---|---|---|---|---|---|
| | Film surface | adhesion (cross cut test) | Erichsen test | DuPont Impact test (½ inch., 100)g | Corrosion resistance (salt spraying test)**** | Solvent resistance | Pencil hardness | |
| Inventive Example II | Lustrous and excellent | 100/100 | More than 7.0 | 50 | No change 1.5 mm | Excellent | 4H | |
| Inventive Example III | " | 100/100 | 5.5 | 50 | No change 1.5 mm | " | 3H | |
| Inventive Example IV | " | 100/100 | 5.2 | 50 | No change 2.0 mm | " | 3H | |
| Inventive Example V | " | 100/100 | 6.5 | 50 | No change 1.5 mm | " | 4H | |
| Inventive Example VI | " | 100/100 | 5.3 | 50 | No change 3.0 mm | " | 2H | |
| Inventive Example VII | " | 100/100 | 6.2 | 50 | No change 2.5 mm | " | 3H | |
| Inventive Example VIII | " | 99/100 | 5.1 | 50 | No change 3.0 mm | " | 4H | |
| Inventive Example IX | " | 100/100 | 5.0 | 40 | No change 3.0 mm | " | 4H | |
| Inventive Example X | " | 99/100 | 6.0 | 50 | No change 2.5 mm | "3H | | |

TABLE II-6

| | | | | Properties of coated film*** | | | |
|---|---|---|---|---|---|---|---|
| | Film surface | Adhesion (cross cut test) | Erichsen test | DuPont Impact test (½ inch., 100g) | Corrosion resistance (salt spraying test)**** | Solvent resistance | Pencil hardness |
| Inventive Example XI | Lustrous and excellent | 96/100 | 5.1 | 40 | No change 3.0 mm | Excellent | 3H |
| Inventive Example XII | " | 99/100 | 5.3 | 40 | No change 2.5 mm | " | 2H |
| Inventive Example XIII | " | 100/100 | 6.5 | 50 | No change 1.5 mm | " | 3H |
| Comparative Example II | — | — | — | — | — | — | — |
| Comparative Example III | Lusterless coarse and craters appeared | 65/100 | 2.1 | 30 | rusted on the whole surface 9 mm | poor | F |
| Comparative Example IV | " | 75/100 | 2.0 | 30 | rusted on the whole surface 8 mm | " | F |
| Comparative Example V | " | 85/100 | 2.5 | 30 | rusted on the whole surface 10 mm | Bad | B |
| Comparative Example VI | " | 70/100 | 2.0 | 30 | rusted on the whole surface 10 mm | " | B |

TABLE II-7

| | | | | Properties of coated film*** | | | |
|---|---|---|---|---|---|---|---|
| | Film surface | adhesion (cross cut test) | Erichsen test | DuPont Impact test (½ inch., 100g) | Corrosion resistance (salt spraying test)**** | Solvent resistance | Pencil hardness |
| Comparative Example VII | Lustrous and sticky | 85/100 | 3.2 | 30 | rusted on the whole surface 15 mm | Bad | less than 2B |
| Comparative Example VIII | coarse and craters appeared | 90/100 | 3.2 | 40 | rusted on the whole surface 7.5 mm | poor | F |

NOTE:
* Amounts of gelation inhibitors are parts by weight per 100 parts by weight to a butadiene lower polymer.
** Throwing power: These values were measured by the use of a usual throwing power measuirng device (pipe method) and show amounts electrodeposited on a measuring plate in a pipe (a length of the electrodeposited plate part) when applying a necessary voltage for 3 minutes so as to cause a film deposited on an outer standard plate to be 20-25μ. Higher values appearing in the Table show superiority in throwing power.
*** Coated film performance tests were conducted according to JIS K 5400.
**** Corrosion resistance: The coated film on the test piece was cut with a knife to make two crossed cut lines reaching to the test piece surface. The thus cut test piece was subjected to a salt spraying test for 400 hours according to JIS z2371 and then washed with clean water and air-dried. Directly after that, two cellophane tapes were put on the two crossed cut lines, respectively, and then stripped off. These values were given by the largest length of the rusted surface from the line.

What is claimed is:

1. A water-soluble coating composition comprising an adduct (1) of a butadiene lower polymer or lower copolymer (A) which has a number average molecular weight in a range of 200-10,000 and is liquid or semi-liquid at room temperature and α,β-ethylenically unsaturated dicarboxylic acid compound (B) resulting from the reaction of said (A) and (B) at a temperature in the range of 120° to 250° C. in the presence of at least one quinoline derivative (C) in an amount of 0.005 to 5 percent by weight of said (A), said quinoline derivative being of the general formula:

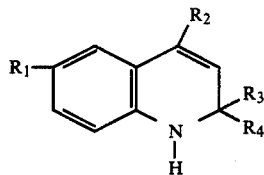

in which $R_1$ is a hydrgen atom or an alkoxy group having 1 to 5 carbon atoms, and $R_2$, $R_3$ and $R_4$ are the same or different alkyl groups each having 1 to 5 carbon atoms; a hydrophilic solvent (2) in an amount of less than 100 parts by weight to 100 parts by weight of said (A); and a neutralizer (3) in a range of 0.2 to 2.0 equivalents to said (A).

2. The water soluble coating composition as claimed in claim 1, in which said quinoline derivatives (C) are 1,2-dihydro-2,2,4-trimethylquinoline, 1,2-dihydro-2,2,4-triethylquinoline, 1,2-dihydro-2,2,4-tri-n-propylquinoline, 1,2-dihydro-2,2,4-tri-n-butylquinoline, 1,2-dihydro-2,2-dimethyl-4-ethylquinoline, 1,2-dihydro-2,2,4-trimethyl-6-methoxyquinoline, 1,2-dihydro-2,2,4-trimethyl-6-propoxyquinoline or 1,2-dihydro-2,2,4-trimethyl-6-n-butoxyquinoline.

3. The water-soluble coating composition as claimed in claim 2, in which said compound (C) consists of more than one of said quinolene derivatives.

4. The water soluble coating composition as claimed in claim 1, in which said α,β-ethylenically unsaturated dicarboxylic acid compound (B) is maleic anhydride, citraconic anhydride, 1,2-diethylmaleic anhydride, maleic acid monomethyl ester, maleic acid dimethyl ester or maleic acid diethyl ester.

5. The water soluble coating composition as claimed in claim 1, in which said amount of (C) is 0.1 to 2.0 percent by weight to said (A).

6. The water soluble coating composition as claimed in claim 1, in which the reaction mixture of said addition reaction is heated to 150° to 220° C.

7. The water-soluble coating composition as claimed in claim 1, in which said hydrophilic solvent (2) is methanol, ethanol, buthanol, ethylene glycol monomethyl ether, ethylene glycol monoethyl ether, ethylene glycol monobutyl ether, tetrahydrofuran, dioxane, diacetone alcohol, acetone, methyl ethyl ketone or methyl acetate.

8. The water-soluble coating composition as claimed in claim 1, in which said neutralizer (3) is sodium hydroxide, potassium hydroxide, ammonia water, diethylamine, triethylamine, N-morpholine, ethylenediamine, diethylenetriamine, monoethanolamine, diethanolamine, triethanolamine or cyclohexylamine.

9. The water-soluble coating composition as claimed in claim 1, which further comprises siccatives.

10. The water-soluble coating composition as claimed in claim 1 which further comprises pigments.

11. A water-soluble coating composition comprising an adduct (1) of a butadiene lower polymer or lower copolymer with a co-monomer (A) selected from the group consisting of isoprene, 2,3-dimethyl butadiene, piperylene, α-methyl styrene, vinyltoluene and divinylbenzene, said polymer or copolymer having a number average molecular weight in the range of 200-10,000 and being liquid or semi-solid at room temperature and α,β-ethylenically unsaturated dicarboxylic acid compound (B) selected from the group consisting of maleic anhydride, citraconic anhydride, 1,2-diethylmaleic anhydride, maleic acid monomethyl ester, maleic acid dimethyl ester and maleic acid diethyl ester resulting from the reaction of said (A) and (B) at a temperature in the range of 120° to 250° C. in the presence of at least one quinoline derivative (C) in an amount of 0.005 to 5 percent by weight of said (A), said quinoline derivative being of the general formula:

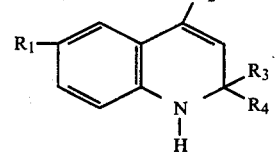

in which $R_1$ is a hydrogen atom or an alkoxy group having 1 to 5 carbon atoms, and $R_2$, $R_3$ and $R_4$ are the same or different alkyl groups each having 1 to 5 carbon atoms; a hydrophilic solvent (2) in an amount of less than 100 parts by weight to 100 parts by weight of said (A), said hydrophilic solvent being selected from the group consisting of methanol, ethanol, butanol, ethylene glycol monomethyl ether, ethylene glycol monoethyl ether, ethylene glycol monobutyl ether, tetrahydrofuran, dioxane, diacetone alcohol, acetone, methyl ethyl ketone and methyl acetate; and a neutralizer (3) in a range of 0.2 to 2.0 equivalents to said (A), said neutralizer being selected from the group consisting of sodium hydroxide, potassium hydroxide, ammonia water, diethylamine, triethylamine, N-morpholine, ethylenediamine, diethylenetriamine, monoethanolamine, diethanolamine, triethanolamine and cyclohexylamine.

12. A water-soluble coating composition comprising an adduct (1) of a butadiene lower polymer or lower copolymer with a co-monomer (A) selected from the group consisting of isoprene, 2,3-dimethyl butadiene, piperylene, α-methyl styrene, vinyltoluene and divinylbenzene and 3–50 percent by weight of an $\alpha,\beta$ ethylenically unsaturated dicarboxylic acid compound (B) selected from the group consisting of maleic anhydride, citraconic anhydride, 1,2-diethylmaleic anhydride, maleic acid monomethyl ester, maleic acid dimethyl ester and maleic acid diethyl ester resulting from the reaction of said (A) and (B) at a temperature of 120°–250° C. in the presence of from 0.005–5 percent by weight to the amount of said (A) of one or more of compounds (C) selected from the group consisting of 1,2-dihydro-2,2,4-trimethylquinoline, 1,2-dihydro-2,2,4-triethylquinoline, 1,2-dihydro-2,2,4-tri-n-propylquinoline, 1,2-dihydro-2,2,4-tri-n-butylquinoline, 1,2-dihydro-2,2-dimethyl-4-ethylquinoline, 1,2-dihydro-2,2,4-trimethyl-6-methoxyquinoline, 1,2-dihydro-2,2,4-trimethyl-6-propoxyquinoline and 1,2-dihydro-2,2,4-trimethyl-6-n-butoxyquinoline; a hydrophilic solvent (2) selected from the group consisting of methanol, ethanol, butanol, ethylene glycol monomethyl ether, ethylene glycol monoethyl ether, ethylene glycol monobutyl ether, tetrahydrofuran, dioxane, diacetone alcohol, acetone, methyl ethyl ketone and methyl acetate in an amount of less than 100 parts by weight to 100 parts by weight of the amount of said (A); and a neutralizer (3) selected from the group consisting of sodium hydroxide, potassium hydroxide, ammonia water, diethylamine, triethylamine, N-morpholine, ethylenediamine, diethylenetriamine, monoethanolamine, diethanolamine, triethanolamine and cyclohexylamine in the amount of 0.2 to 2.0 equivalents to the amount of said (A).

* * * * *